(12) United States Patent
Conner

(10) Patent No.: US 6,186,311 B1
(45) Date of Patent: Feb. 13, 2001

(54) SELF-TRANSPORTING MULTIPLE CONVEYOR SYSTEM

(75) Inventor: Edward L. Conner, Medina, OH (US)

(73) Assignee: Ohio Machinery Co., Broadview Heights, OH (US)

(*) Notice: Under 35 U.S.C. 154(b), the term of this patent shall be extended for 0 days.

(21) Appl. No.: 09/200,255

(22) Filed: Nov. 25, 1998

(51) Int. Cl.$^7$ ................................................ B65G 41/00
(52) U.S. Cl. .......................... 198/300; 198/306; 198/313
(58) Field of Search .................... 198/300, 306, 198/302, 313, 632, 318

(56) References Cited

U.S. PATENT DOCUMENTS

| | | | |
|---|---|---|---|
| 2,303,684 * | 12/1942 | Cook | 198/313 |
| 3,563,477 | 2/1971 | Schroeder et al. | 241/101 |
| 3,837,508 * | 9/1974 | Stefanelli | 198/300 |
| 3,927,839 | 12/1975 | Quinn | 241/76 |
| 4,084,496 | 4/1978 | Ehernberger et al. | 100/35 |
| 4,135,614 * | 1/1979 | Penterman et al. | 198/306 |
| 4,245,732 * | 1/1981 | Couperus | 198/313 |
| 4,338,872 * | 7/1982 | Decker | 198/666 |
| 4,383,651 | 5/1983 | Couperus | 241/81 |
| 4,427,104 * | 1/1984 | Reid, Jr. | 198/313 |
| 4,585,179 | 4/1986 | Tsuji et al. | 241/101.7 |
| 4,598,875 | 7/1986 | Bronson et al. | 241/78 |
| 4,624,357 * | 11/1986 | Oury et al. | 198/317 |
| 4,655,402 | 4/1987 | Desourdy | 241/76 |
| 4,726,459 * | 2/1988 | Vos | 198/306 |
| 4,795,103 | 1/1989 | Lech | 241/77 |
| 4,881,691 | 11/1989 | Oldengott et al. | 241/101.5 |
| 4,951,885 | 8/1990 | Thiis | 241/101.7 |
| 4,981,204 * | 1/1991 | Smith | 198/313 |
| 5,026,205 | 6/1991 | Gorski et al. | 404/72 |
| 5,161,744 | 11/1992 | Schoop et al. | 241/101.7 |
| 5,230,475 | 7/1993 | Gerner | 241/34 |
| 5,333,738 | 8/1994 | Fuchs et al. | 209/38 |
| 5,360,097 * | 11/1994 | Hibbs | 198/313 |
| 5,390,777 * | 2/1995 | Gage | 198/306 |
| 5,515,961 * | 5/1996 | Murphy et al. | 198/306 |
| 5,647,545 | 7/1997 | Conner | 241/79 |
| 5,878,967 | 3/1999 | Conner | 24/79.1 |

* cited by examiner

Primary Examiner—Dean J. Kramer
Assistant Examiner—Paul T. Chin
(74) Attorney, Agent, or Firm—Pearne & Gordon LLP

(57) ABSTRACT

A self-transporting conveyor system suitable for handling the discharge of a rock or concrete crusher, for example. The system includes a pair of stacking conveyors and a pair of transfer conveyors all of which are assembled together for towing by a single highway tractor. The conveyors can be set up at a desired site using available equipment, such as a loader, so that the cost of a special crane is avoided. Each stacking conveyor includes a self-contained hydraulic power supply that allows it to hydraulically fold up for transport, and unfold for operation, and enables it to hydraulically pivot back and forth during operation to build a kidney-shaped pile.

10 Claims, 6 Drawing Sheets

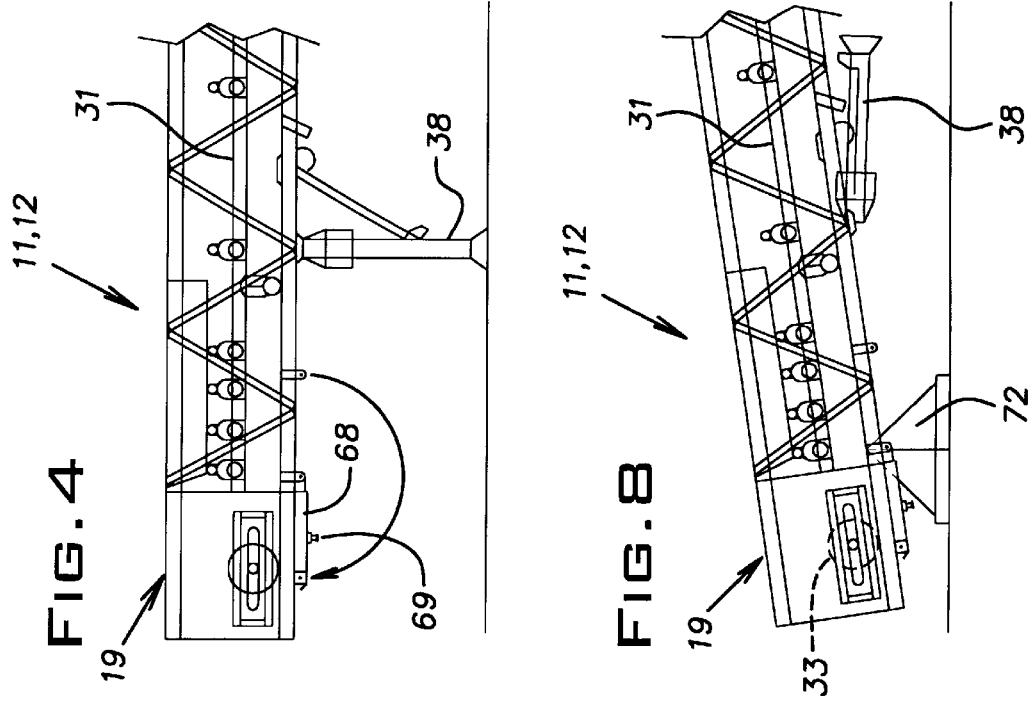
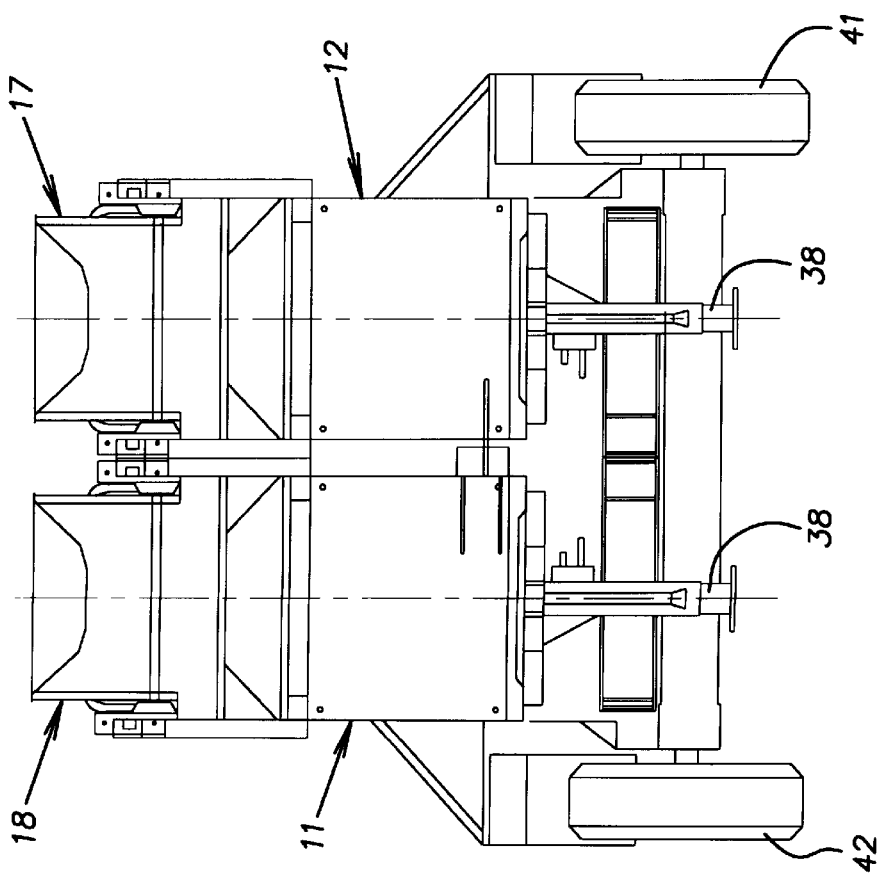

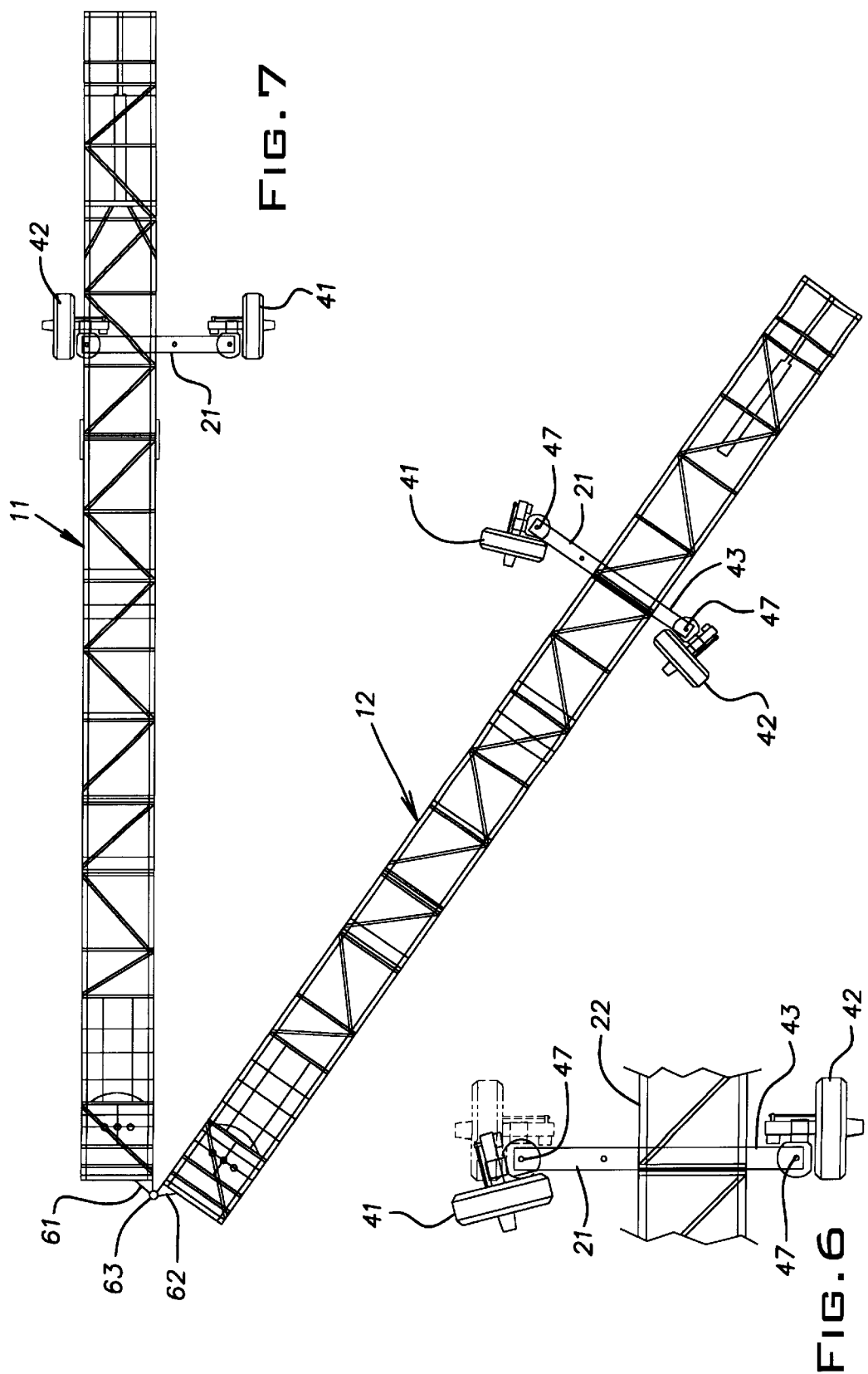

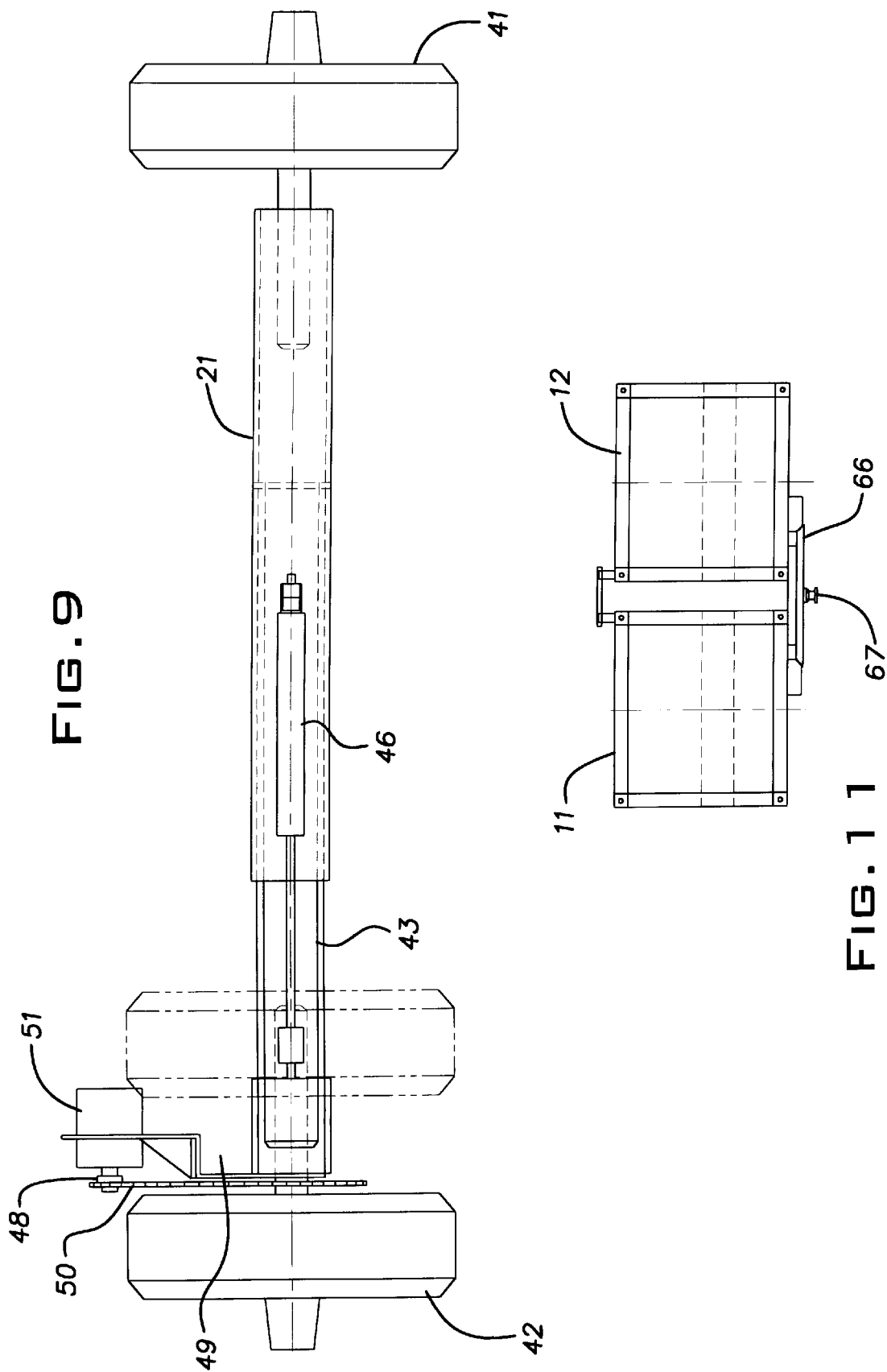

SELF-TRANSPORTING MULTIPLE CONVEYOR SYSTEM

BACKGROUND OF THE INVENTION

The invention relates to conveyor systems for stacking bulk materials and, more particularly, to such conveyor systems that are readily transportable from site to site.

PRIOR ART

Material, such as stone, rock or demolition material, is regularly crushed and screened into aggregate products. Crushing equipment is often moved from location to location as the need changes. Mobility is a necessity where equipment is used for crushing demolition materials on site. Because of seasonal high demand, equipment failure or other reasons, there can be a need to temporarily operate portable equipment at permanent installations such as at a stone quarry, for example.

In crushing operations for rock, stone, concrete or the like, generally, at least two products are made. Such products can be, for instance, fines and a certain screen size. For each product coming off the screen section of the crusher plant, a conveyor circuit is frequently necessary to move the product away from the screen discharge and, normally, stack it on storage piles.

The transport and erection of known portable stacking conveyors has involved substantial time, labor and shipping costs for transport, assembly and disassembly. The typical prior art stacking conveyor had to be transported separately on a highway trailer and often required a crane to unload it, set it up for operation, and later take it down when a job was completed. Consequently a large part of the cost of a job was incurred for equipment transportation and for set up and take down work not associated with production.

SUMMARY OF THE INVENTION

The invention provides a self-transporting and self-erecting conveyor system. In the illustrated embodiment, the system comprises four conveyors that are transported as a single trailer load drawn by a conventional highway tractor. The conveyor includes two stacking conveyors and two transfer conveyors. The disclosed conveyor system can be conveniently set up and later taken down using available material handling equipment such as a loader. The invention, thus, avoids the scheduling and expense of a mobile crane often required with prior known systems.

Each stacking conveyor folds on itself on a horizontal axis to reduce its length for transport. The hinge folding point for each stacking conveyor is arranged so that an area above a main section of the frame is reserved for receiving an associated transfer conveyor for transport purposes. The stacking conveyors are proportioned to lie side by side for transport. The tail or material receiving end of each stacking conveyor receives a common pin that simplifies coupling of the stacking conveyors for transport.

Each of the stacking conveyors is fitted with a separate axle and wheel set for road transport and to enable sideways movement for stacking a kidney shaped pile. The wheels are pivotal on the axles to convert from the transport mode where travel is longitudinal to the operational mode where the motion is side to side or radial. The stacking conveyors each have separate self-contained hydraulic power packs that are used for erecting and, alternatively, retracting various parts of the conveyor for operation or for load transport. Additionally, the power pack can be used to drive the wheels to produce side to side movement of the conveyor.

BRIEF DESCRIPTION OF THE DRAWINGS

FIG. 3 is an elevational view of the tail or material receiving end of the stacker conveyors and the two superposed transfer conveyors on the stacker conveyors all in assembled relation for transport;

FIG. 4 is a fragmentary side elevational view of a tail end of a stacker and its fifth wheel pin being moved into working position as indicated by the arcuate arrow;

FIG. 6 is a fragmentary plan view of an axle and wheel set for one of the stackers;

FIG. 7 is a plan view of the stacker conveyors in an intermediate coupled relationship;

FIG. 8 is a fragmentary elevational view of a tail end of a stacker supported on a turntable resting on the ground;

FIG. 9 is an elevational view of an axle of a stacker;

FIG. 11 is a diagrammatic end view of the stackers showing the fifth wheel pin of one stacker in the transport mode where it serves to connect both stackers to a highway tractor.

DESCRIPTION OF THE PREFERRED EMBODIMENT

Figure 1:
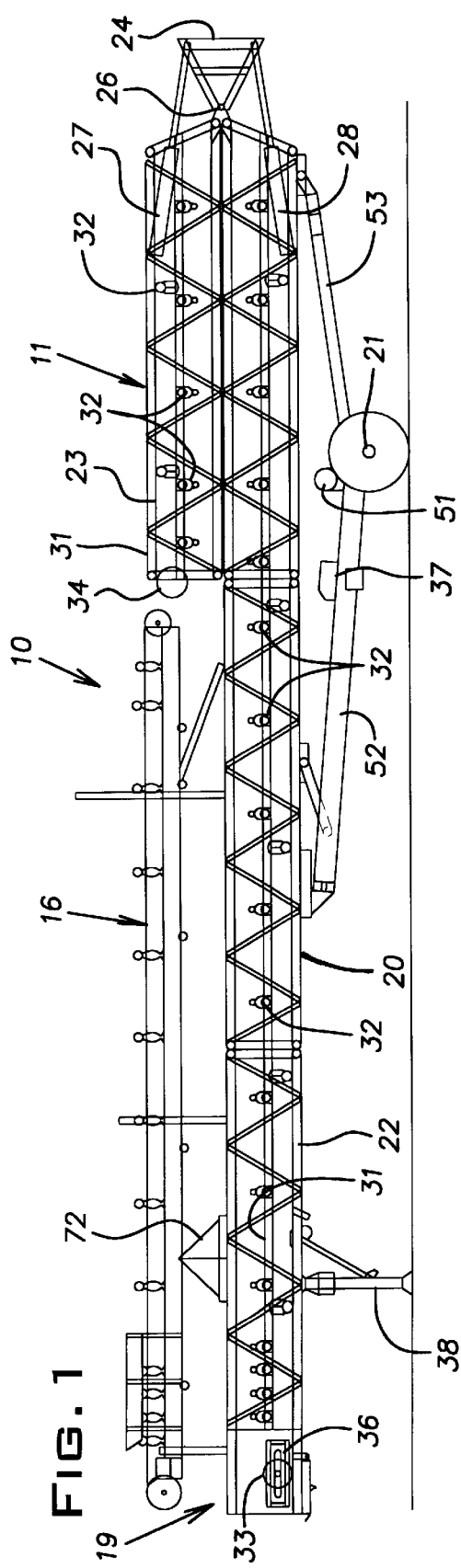
FIG. 1 is a side elevational view of one of the stacker conveyors hereinafter sometimes referred as a stacker and an associated superposed transfer conveyor.
Figure 2:
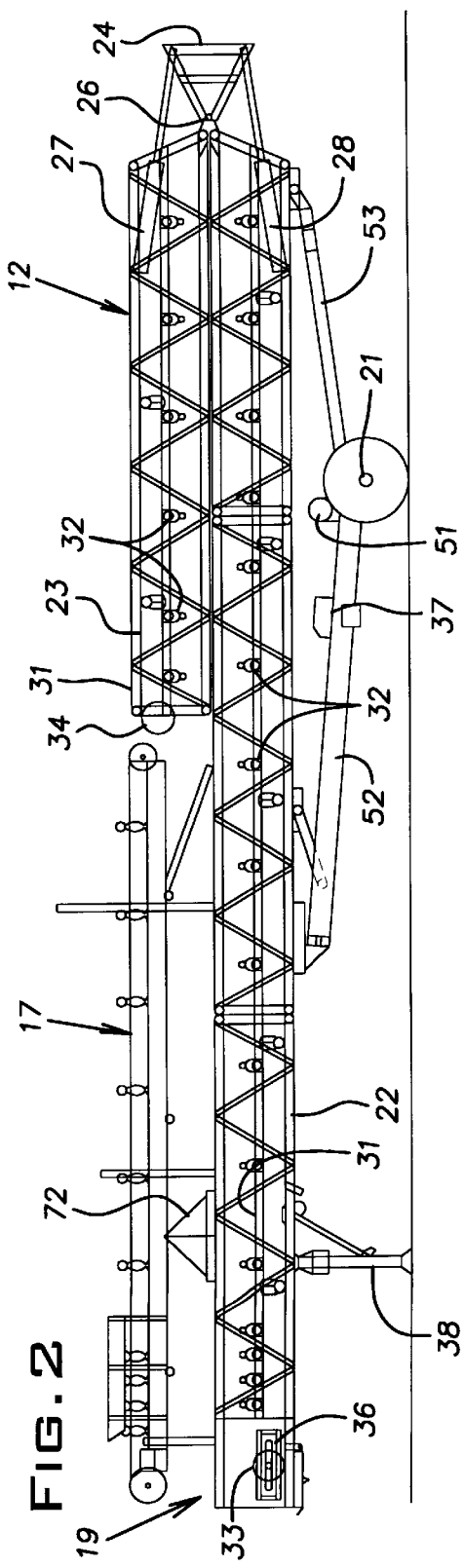
FIG. 2 is a side elevational view of another one of the stacker conveyors and an associated superposed transfer conveyor.
Figure 10:
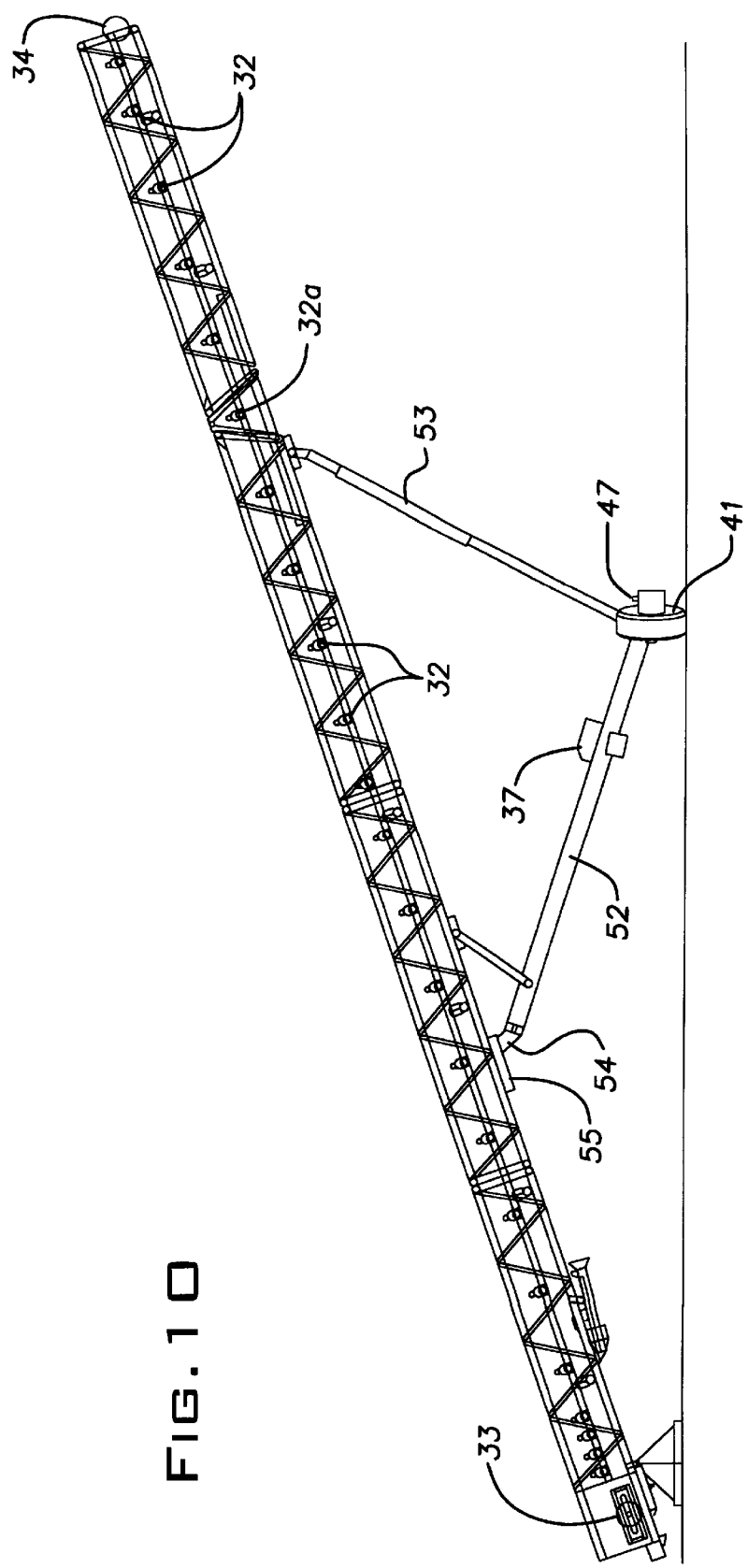
FIG. 10 is an elevational view of a stacker set up in its operational position.

Referring now to the figures, there is shown a stacking conveyor system 10 that comprises a pair of stacking conveyors 11, 12 and a pair of transfer conveyors 16, 17. FIGS. 1–3 illustrate the conveyors assembled for highway transport. FIG. 7 is a plan view of the stacking conveyors or stackers 11, 12 where they are being disassembled from one another in preparation for use. The stackers 11, 12 are substantially the same in general construction and relevant differences are discussed below. As between the stackers 11 and 12, like parts are given the same reference numerals. Each stacker 11, 12 has an elongated truss-type frame 20. By way of example, the stackers 11, 12 can have a nominal unfolded working length of 80 feet. Each stacker 11, 12 is carried on a separate axle 21. The frame of the stacker 11 has a main section 22, a secondary fold-up section 23, and a small triangular intermediate section 24. The sections 23, 24 pivot about a pin 26 that is common to them and to the main section 22. A hydraulic cylinder 27 is connected between the main frame section 22 and the triangular section and, similarly, a hydraulic cylinder 28 is coupled between the secondary section 23 and the triangular section. When the rods of these hydraulic cylinders are extended, the frame sections 23, 24 are in the folded-up position of FIG. 1, and when the cylinder rods are retracted, these sections are in a straight line configuration. A continuous belt 31 is trained over idler pulleys 32 distributed over the frame sections 22–24 and is wrapped around end pulleys 33, 34. A pulley take-up mechanism 36, known in the art, is provided for the end pulley 33 at the "tail" end of the main frame section 22 to adjust the tension in the belt 31. When the frame sections 23 and 24 are folded and not in the straight line operating position of FIG. 10, an idler pulley 32A is removed from the triangular frame section to prevent the belt from being stretched because of an effective increase in the length of the path of the belt 31. A power pack 37 including an internal combustion engine, a hydraulic pump and suitable hydraulic circuitry including a four-section directional control valve is mounted to the main frame section 22. The power pack 37 is hydraulically connected to the hydraulic cylinders 27, 28 and other hydraulic components described hereinbelow. Each stacker 11, 12 includes a retractable manually operated landing gear 38 of known construction.

Figure 5:
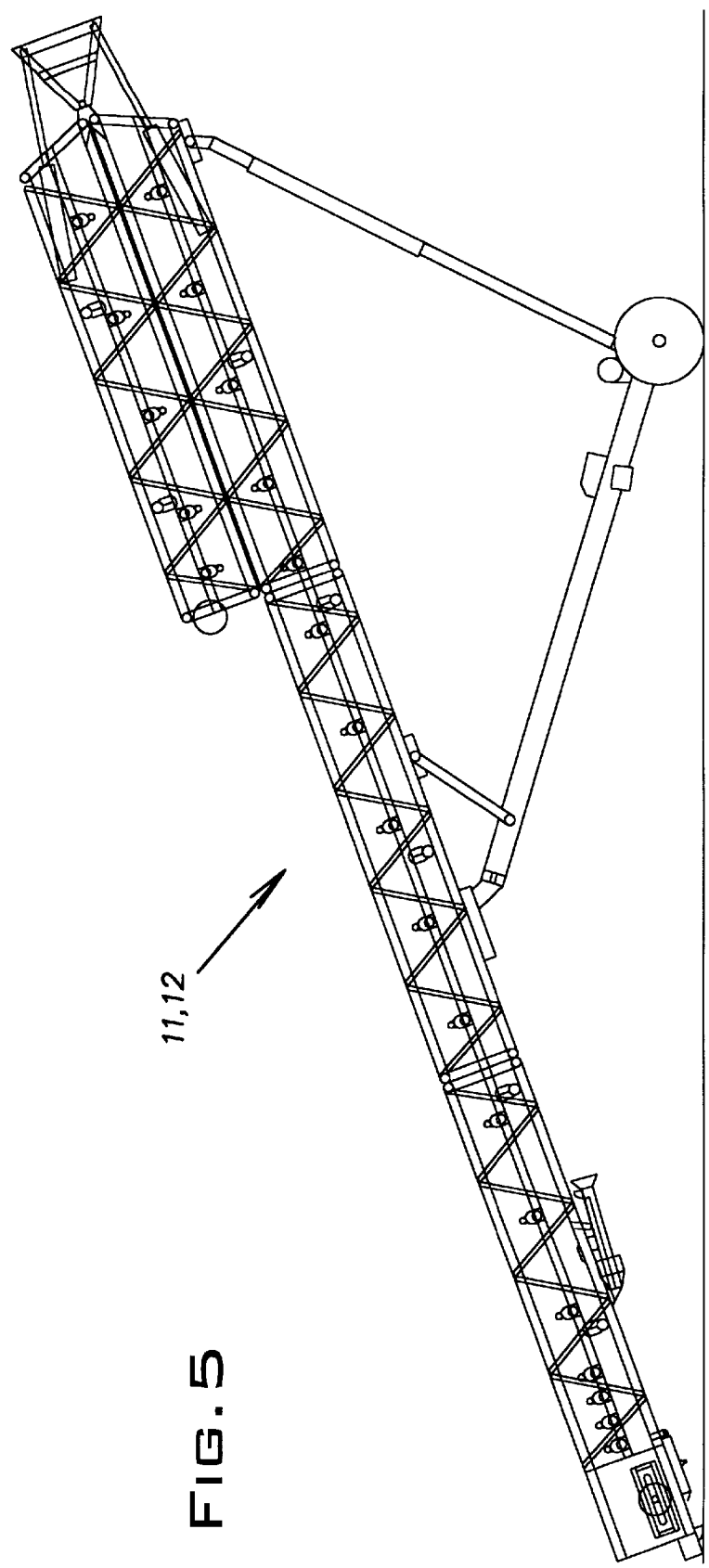
FIG. 5 is a side elevational view of a stacker in an intermediate position between transport and operational modes.

The axle 21 of each stacker 11, 12 is asymmetrical with respect to the frame section with which it is attached so that a cantilevered part of the axle can underlie the other stacker and support a wheel 41 horizontally outboard of this other stacker when the stackers are in the assembled transport condition. A wheel 42 is on a telescoping portion 43 of the axle 21 which can be a square or rectangular tube that slides in a larger square or rectangular tube making up the remainder of the axle 21. FIG. 7 shows the stacker 12 on the left with the telescoping axle and wheel extended, and the stacker 11 on the right with the telescoping axle and wheel retracted. When extended, the telescoping wheels 42 provide stability for the respective stacker when it is in an operating condition and the frame 20 is elevated. In their retracted positions, the telescoping wheels 42 enable the conveyor assembly 10 to meet maximum allowable highway width standards. Each axle tube 43 is extended and retracted hydraulically by an associated hydraulic cylinder 46 (FIG. 9) selectively operated by the hydraulic power pack 37. The wheel 42 on the left in FIG. 9 has been telescoped outwardly from the indicated phantom position. The wheels 41, 42 are supported on vertical axis pivots or king pins on the axles 21. In one position, a wheel 41, 42 has its axis parallel to the axis of the axle 21 while in another position, the wheel 41, 42 has its axis nearly perpendicular to the axis of the axle so that the wheel axis intercepts the tail, designated 19, of the frame 20. The wheel 42 on the axle telescoping portion 43, is driven selectively in either direction by a hydraulic motor and gear box assembly 51 (FIG. 9). The hydraulic motor and gear box 51 operates through a pair of sprockets 48, 49 and a chain drive 50. The hydraulic motor 51 is selectively operated by the power pack 37 and related directional controls. As shown in FIGS. 1, 2 and 5, the axle 21 is attached to struts 52. The struts 52 have ends 54 with pins or rollers that move longitudinally a limited distance in a track 55. Between the axle 21 and an end of the main frame away from the tail end there is disposed a hydraulic cylinder 53 that selectively raises or lowers the discharge end of a stacker 11, 12 by fluid control from the power pack 37.

For purposes of explanation, it will be assumed at this point the conveyor system 10 is assembled for transport. The stackers 11 and 12 have mating right hand and left hand brackets 61, 62 that are coupled by a vertical locking pin 63. Furthermore, interlocking surfaces can be provided at the plane between the stackers 11 and 12 that automatically interengage when one of the stacker frames is finally lowered from an elevated position. As described more fully below, each stacker 11 and 12 has a separate fifth wheel pin to enable it to be separately moved by a highway tractor when desired. When the stackers 11 and 12 are assembled for transport together, the fifth wheel pin 67 of one stacker 12 (FIG. 11) serves both stackers 11 and 12. To accommodate this versatility, a plate 66 carrying the fifth wheel pin 67 of the stacker 12 is mounted with bracketry that enables it to slide horizontally partially under the other stacker 11. A plate 68 (FIG. 4) carrying the fifth wheel pin 69 for the other stacker 11 is pivoted underneath the frame through 1800 to make room for the sliding fifth wheel pin plate 66. Suitable pins and/or bolts are used to hold the plates 66 and 68 in their alternative positions.

The transfer conveyors 16, 17 are suitably bolted to the main sections 22 of the frames 20 of the stackers 11 and 12 in areas not covered by the fold-up sections 23. The assembled conveyor system 10 is conveniently transported over public roadways with a conventional road tractor from site to site.

Immediately following is an outline discussion of the procedures to set up the conveyor system 10 for operation at a site such as where a crusher is processing rock, construction debris or other rock or stone-like material. With the assembly 10 delivered to the site, the landing gears 38 of both stackers 11, 12 are deployed and the tractor is disengaged from the king pin 67 used to draw both stackers.

A turn and brake light assembly, not shown, can be supplied when the system is operating as a trailer on the highway and can be removed during operation of the stackers. Drive chains 50, removed from the sprockets 48, 49 of the hydraulic motor and gear boxes 51 and associated wheels 42 during highway transport, are installed. The wheels 41, 42 can be provided with suitable air brakes and circuitry for operating them while disconnected from a tractor. The transfer conveyors 16 and 17 are unbolted and lifted off by available equipment such as a loader from the top of the stackers 11, 12 and appropriately positioned.

The plate 66 is released from a bolted connection with the stacker 11 and is slid on its guides laterally until it is centered under the main frame section 22 of the stacker 12 and bolted securely in place. The pivotal plate 68 is unbolted from its retracted position and folded forwardly, FIG. 4, to its forward-most position under the main frame section of the stacker 11 and is bolted in place. A loader or other machinery is used to suspend the tails of the stackers 11 and 12 while the landing gear of each stacker is folded up. Thereafter, the tails of the stackers 11 and 12 are lowered to the ground as shown in FIG. 5. The power pack 37 of the stacker 11 is operated to extend the hydraulic cylinder 53 to elevate the stacker 11 and disengage overlapping plates or other suitable elements that lock the stackers laterally together for transport. The receiving holes in the brackets 61, 62 are large enough relative to the pin 63 to permit this elevation of the stacker 11 relative to the stacker 12. Suitable pins are provided to mechanically lock the position of the selected extension of the hydraulic cylinder 53.

At the stacker 12, the side of the frame 22 associated with the outboard or non-telescoping wheel 41 is jacked up and this wheel is rotated about its king pin to position and lock it in its lateral position where its axis of rotation points to the tail end of the stacker. The wheel 41 is lowered and the opposite side of the stacker frame 22 is jacked up. The axle section 43 is then extended or telescoped by operation of the associated hydraulic cylinder 46 using the power pack 37 of this stacker 12 to increase the track of the wheels 41, 42 for stability during stacking operations, and the drive wheel 42 is swung about its king pin to its lateral position where its axis of rotation points to the tail end of the stacker. Suitable pins are provided to lock the wheels in their alternative positions. The jack is then released to lower the wheel 42 onto the ground.

The stacker 12 is radiated away from the other stacker 11 by operating the hydraulic motor and gear box 51 of this stacker 12. Stacker 11 is then lowered to its travel position by operating its hydraulic cylinder 53. The pin 63 joining the tails of the stackers 11 and 12 is removed and a loader or other machinery is hooked to the stacker 11 to separate the tails of the stackers.

The wheels 41, 42 of the stacker 12 are thereafter jacked up and rotated back about their king pins and locked in their original transport positions. The stackers 11 and 12 are transported to their desired operating positions. A swivel base or turntable 72, one for each stacker 11 and 12, is placed on the ground at a point where material is to be delivered and about which it is desired that the respective stacker 11 or 12 will be caused to oscillate laterally when building a kidney-shaped pile. The swivel base is designed to support the tail end of its respective stacker slightly off the ground and permit it to laterally oscillate about a vertical axis of the center of the base so that when the stacker oscillates, it maintains its receiving or tail end in a constant location.

Once the stackers have been set in position on the swivel bases 72, they can be jacked up and their wheels can be pivoted and locked for radial (lateral) motion. At this time the axle of the stacker 11 can be extended as earlier described for the stacker 12. For each stacker 11, 12, bolts holding the folded back secondary truss section 23 to the main truss section 22 are removed and the associated power pack is energized to fully unfold the secondary truss section by energizing the associated hydraulic cylinders 27, 28. The triangular truss section 24 is bolted to the other sections 22, 23 and the idler pulley 32A is installed in position. Where necessary, the pulley take up 36 can be adjusted to tighten the belt 31. The pulley 34 at the discharge end of the frame 20 can be operated by an electric motor suitably connected to an electric power source to drive the belt 31 in a circulating path on the frame 20.

The discharge height of each stacker 11, 12 is adjusted by operation of the respective hydraulic cylinder 53. Each stacker 11 and 12 can create a kidney shaped pile, when viewed from above, by causing the stacker to move radially or laterally through operation of the associated hydraulic motor and gear box 51 to rotate the driven wheel 42 in an appropriate direction with operation of the power pack 37. The transfer conveyors 16, 17 can be used to either feed one of the stackers or to otherwise convey material being processed at the site from one point to another.

When the work has been completed at a particular site and it is desired to transport the system to another site, the procedures outlined above to set up the stackers for operation are essentially reversed.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed is:

1. A self-transporting multiple conveyor system comprising a pair of longitudinally extending conveyor frames, a conveyor belt supported on pulleys on each frame, a separate axle and wheel set associated with each of said frames for supporting its respective frame for transport on a highway, each axle extending horizontally and having opposite ends, the wheel set of each axle including a highway transport wheel adjacent each end of the axle, the frames each having an end arranged to be towed by a highway tractor, disengageable coupling members for joining the frames in close side-by-side relation during highway transport, the axle of each conveyor frame including a part with an associated highway transport wheel that extends under the other conveyor frame when the frames are coupled side-by-side so that the associated wheel underlies the other conveyor frame, and a fifth wheel pin at said frame ends arranged to serve both of said conveyor frames for towing said conveyor together with a highway tractor.

2. A self-transporting multiple conveyor system as set forth in claim 1, wherein each of said frames at its said end has a fifth wheel pin for coupling with a highway tractor.

3. A self-transporting multiple conveyor system as set forth in claim 1, wherein the wheel sets of each axle include a wheel adjacent each end of the axle that is pivotal on a king pin having a substantially vertical axis whereby said wheels can be turned alternatively between a road transport position and a radial stack forming position.

4. A self-transporting multiple conveyor system as set forth in claim 3, wherein each of said conveyors has a hydraulic power pack for selectively power operating a wheel to cause the respective conveyor to move radially.

5. A self-transporting multiple conveyor system as set forth in claim 1, wherein each of said conveyors has an elongated truss type frame that has articulated sections that fold on each other for highway transport and that extend into a straight line condition for operation.

6. A self-transporting multiple conveyor system as set forth in claim 5, wherein each of said conveyors has a hydraulic cylinder for manipulating said sections between their folded up positions in their operating positions.

7. A self-transporting multiple conveyor system as set forth in claim 1, wherein each of said axles has a telescoping section to increase the track of the axle for increased stability during operation.

8. A conveyor for stacking crushed material comprising an elongated frame extending between a material receiving end of the conveyor and a discharge end of the conveyor, a conveyor belt for circulating over the frame, a set of highway transport wheels on the frame between the receiving end and the discharge end for transporting the conveyor over a roadway, each of said wheels being selectively pivotal about a substantially vertical axis alternatively between a position for transporting the conveyor over a roadway and a position for supporting the conveyor for radial movement about a pivot center adjacent the receiving end, and a motor associated with one of said highway transport wheels to drive said one wheel in alternative rotary directions when said wheel is in said radial movement position whereby the discharge end of said conveyor can be moved laterally to create a kidney-shaped pile of material.

9. A conveyor as set forth in claim 8, including a device to support the material receiving end off the ground and allow movement of remaining parts of the conveyor about a vertical pivot center axis determined by said device.

10. A self-transporting conveyor system comprising a stacking conveyor having an elongated truss-type frame, the frame having a receiving end and a discharge end, a conveyor belt mounted for circulation on the frame, the frame having a folding point between its ends, the folding point being arranged away from the mid-length of the frame as determined when the frame is in a straight line extended position for operation such that the frame includes a primary section and a shorter secondary section, the secondary section being disposed above a portion of the primary section substantially equal in length to the length of the secondary section, and a transfer conveyor separate from and independently operable of the stacking conveyor, the transfer conveyor being carried on the primary section not surmounted by the secondary section in its folded position temporarily during transport of the system from site to site.

* * * * *